United States Patent
Nykerk et al.

(10) Patent No.: US 10,851,962 B2
(45) Date of Patent: Dec. 1, 2020

(54) BACKLIT 3D LAMP

(71) Applicant: Flex-N-Gate Advanced Product Development, LLC, Tecumseh (CA)

(72) Inventors: Todd Nykerk, Holland, MI (US); Les Sullivan, Wyoming, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 0 days.

(21) Appl. No.: 16/177,995

(22) Filed: Nov. 1, 2018

(65) Prior Publication Data

US 2019/0178464 A1 Jun. 13, 2019

Related U.S. Application Data

(60) Provisional application No. 62/597,871, filed on Dec. 12, 2017.

(51) Int. Cl.
| | |
|---|---|
| *F21V 1/00* | (2006.01) |
| *F21S 43/236* | (2018.01) |
| *F21S 43/13* | (2018.01) |
| *F21V 8/00* | (2006.01) |
| *F21S 43/20* | (2018.01) |

(52) U.S. Cl.
CPC .............. *F21S 43/236* (2018.01); *F21S 43/13* (2018.01); *F21S 43/26* (2018.01); *G02B 6/003* (2013.01)

(58) Field of Classification Search
CPC .................................. F21S 43/13; G02B 6/003
See application file for complete search history.

(56) References Cited

U.S. PATENT DOCUMENTS

| | | |
|---|---|---|
| 2,550,350 A | 4/1951 | West Henson |
| 5,070,432 A | 12/1991 | Kitazumi et al. |
| 6,481,849 B2 | 11/2002 | Martin et al. |

(Continued)

FOREIGN PATENT DOCUMENTS

| | | |
|---|---|---|
| CN | 202188326 U | 4/2012 |
| WO | 2016191321 A1 | 12/2016 |

OTHER PUBLICATIONS

PCT Patent Application PCT/US2018/059750 International Search Report and Written Opinion dated Mar. 21, 2019.

(Continued)

*Primary Examiner* — Matthew J. Peerce
(74) *Attorney, Agent, or Firm* — Erise IP, P.A.

(57) ABSTRACT

A backlit three-dimensional lamp for a vehicle includes an indicia rendering disposed on a transparent lenticular sheet, an outer lens positioned in front of the transparent lenticular sheet, and a light source positioned behind the transparent lenticular sheet. The light source provides backlighting of the indicia rendering such that the lenticular sheet projects a forward image that hovers beyond the outer lens. A vehicle light assembly includes a light source adapted to produce a substantially homogeneous light, a rendering of indicia located adjacent the light source and facing away from the light source such that the rendering of indicia is backlit by the light source, and an array of light-modifying elements aligned with the light source to at least partially cover the rendering of indicia for creating a projection of the rendering of indicia outside the vehicle light assembly.

14 Claims, 6 Drawing Sheets

(56) References Cited

U.S. PATENT DOCUMENTS

| | | | |
|---|---|---|---|
| 7,058,252 B2 * | 6/2006 | Woodgate | G02B 30/25 |
| | | | 385/16 |
| 8,632,189 B2 | 1/2014 | Read et al. | |
| 8,870,380 B2 | 10/2014 | Huang | |
| 10,006,600 B2 * | 6/2018 | Jo | G02B 27/2214 |
| 2005/0007664 A1 | 1/2005 | Harris et al. | |
| 2007/0047217 A1 * | 3/2007 | Konet | B60R 13/00 |
| | | | 362/84 |
| 2007/0081131 A1 | 4/2007 | Van Der Palen et al. | |
| 2010/0207961 A1 * | 8/2010 | Zomet | G02B 30/27 |
| | | | 345/630 |
| 2012/0099194 A1 * | 4/2012 | Verschuren | G02B 30/27 |
| | | | 359/463 |
| 2012/0313392 A1 * | 12/2012 | Bingle | B60R 13/005 |
| | | | 296/1.08 |
| 2014/0133128 A1 | 5/2014 | Oh | |
| 2017/0274745 A1 | 9/2017 | Lewis et al. | |
| 2017/0314759 A1 | 11/2017 | Nykerk et al. | |
| 2018/0340671 A1 * | 11/2018 | Abiru | B29C 51/08 |

OTHER PUBLICATIONS

Johnson et al. Advances in Lenticular Lens Arrays for Visual Display. SPIE. Aug. 5, 2005 22 (Retrieved Dec. 18, 2019]. Retrieved from internet: https://www.researchgate.net/publication/237674438_Advances_in_lenticular_lens_arrays_for_visual_display_Invited_Paper.

* cited by examiner

BACKLIT 3D LAMP

CROSS-REFERENCE TO RELATED APPLICATIONS

This application claims the benefit of U.S. Provisional Patent Application Ser. No. 62/597,871 entitled Backlit 3D Lamp and filed Dec. 12, 2017, the disclosure of which is herein incorporated by reference in its entirety.

BACKGROUND

1. Field of the Disclosure

Embodiments of this disclosure are in the field of light assemblies for use in vehicles. More specifically, embodiments of this disclosure include backlit three-dimensional markings integrated within vehicle light assemblies.

2. Description of the Related Art

None.

SUMMARY

In an embodiment, a backlit three-dimensional lamp for a vehicle includes an indicia rendering disposed on a transparent lenticular sheet, an outer lens positioned in front of the transparent lenticular sheet, and a light source positioned behind the transparent lenticular sheet to provide backlighting of the indicia rendering such that the lenticular sheet projects a forward image that hovers beyond the outer lens.

In another embodiment, a vehicle light assembly includes a light source adapted to produce a substantially homogeneous light, a rendering of indicia located adjacent the light source and facing away from the light source such that the rendering of indicia is backlit by the light source, and an array of light-modifying elements aligned with the light source to at least partially cover the rendering of indicia for creating a projection of the rendering of indicia outside the vehicle light assembly.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

In certain lighting applications, markings may be incorporated into a lamp of a light assembly for producing a desired visual effect. Some examples of markings include logos, designs, emblems, geometric shapes, graphics, images, text, indicia, renderings, etc. Markings traditionally appear in a standard two-dimensional (2D) format within a light assembly. In other words, the markings have a flat appearance and the markings appear to be located behind or within an outer lens of the light assembly.

What is disclosed is a way to create different kinds of visual effects to provide customization for light assemblies. Embodiments of the present disclosure provide a lamp that projects a backlit three-dimensional (3D) image (e.g., an automotive manufacturer logo) to provide a unique visual effect for a light assembly.

Figure 1:
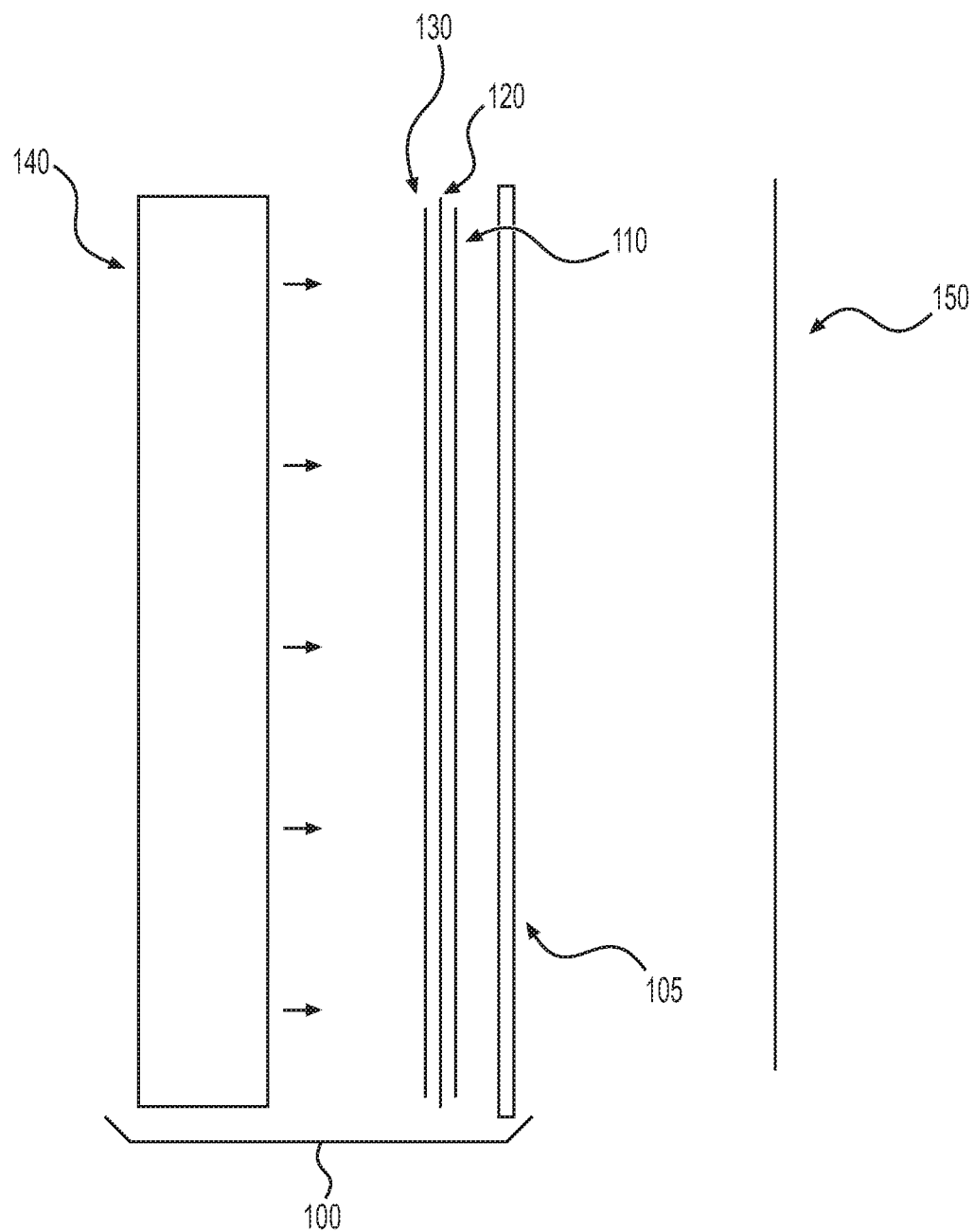
FIG. 1 is a cross-sectional side view of a backlit three-dimensional (3D) lamp, in an embodiment.

FIG. 1 shows a cross-sectional side view of an exemplary backlit 3D lamp 100 for a vehicle light assembly. The side view depicted in FIG. 1 represents a cross-section at or near a center of a lift-gate lamp assembly of a vehicle. However, the same basic arrangement, including minor variations thereof, may be used to provide a backlit 3D lamp for other lighting applications. Backlit 3D lamp 100 provides a marking that hovers outside the lamp such that the marking appears to be floating outside of the lamp when viewed from outside the lamp. The marking also appears to move as the viewer moves from side-to-side with respect to the image (see e.g., the differing appearance between FIGS. 5 and 6). At night, the 3D marking is visible when backlit via a light source. During the day, the 3D marking is visible due to reflection of ambient light without a dedicated light source.

Backlit 3D lamp 100 includes an outer lens 105, a lenticular sheet 110, a rendering 130, and a light source 140, which are structurally supported and held in alignment with one another via a lamp housing (not shown). In the embodiment depicted in FIG. 1, rendering 130 is attached to lenticular sheet 110 via an adhesive 120.

Outer lens 105 is made of a transparent material configured to protect inner portions of lamp 100 from outdoor elements while allowing light from the light source 140 to pass through. In certain embodiments, light source 140 is a homogenous light source that produces a uniform and homogenous appearing light output without the appearance of hot spots. In certain embodiments, light source 140 is one or more light-emitting diodes (LEDs). In some embodiments, light source 140 is a light bulb.

Lenticular sheet 110 is for example an optically clear sheet made of plastic with a lenticular pattern molded into one side and a flat surface on the opposite side. The lenticular pattern is an array of light-modifying elements, such as an array of convex lenses that focus light according to a particular prescription. Lenticular sheet 110 is adapted to at least partially cover the marking creating a projection of the marking outside lamp 100.

Rendering 130 is for example an interlaced image (see e.g., FIG. 3) of a marking configured to produce a 3D projection of the marking. Rendering 130 may be formed (e.g., printed) on an opaque material or a semi-opaque material and aligned adjacent lenticular sheet 110. Rendering 130 may include a marking or indicia that covers at least a portion of light source 140 to receive light emitted from the light source 140, and to create a projection of the rendering outside the lamp 100.

Adhesive 120 is for example an optically clear adhesive, such as an adhesive film. In certain embodiments, rendering 130 is fixed to the flat side of lenticular sheet 110 via adhesive 120. With homogenous light source 140 positioned behind rendering 130, backlighting is provided and rendering 130 is said to be "backlit". When backlit, lenticular sheet 110 is configured to project the marking outside lamp 100 as a 3D floating image 150 that hovers outside lamp 100, as further described below in connection with FIG. 3.

Figure 2:
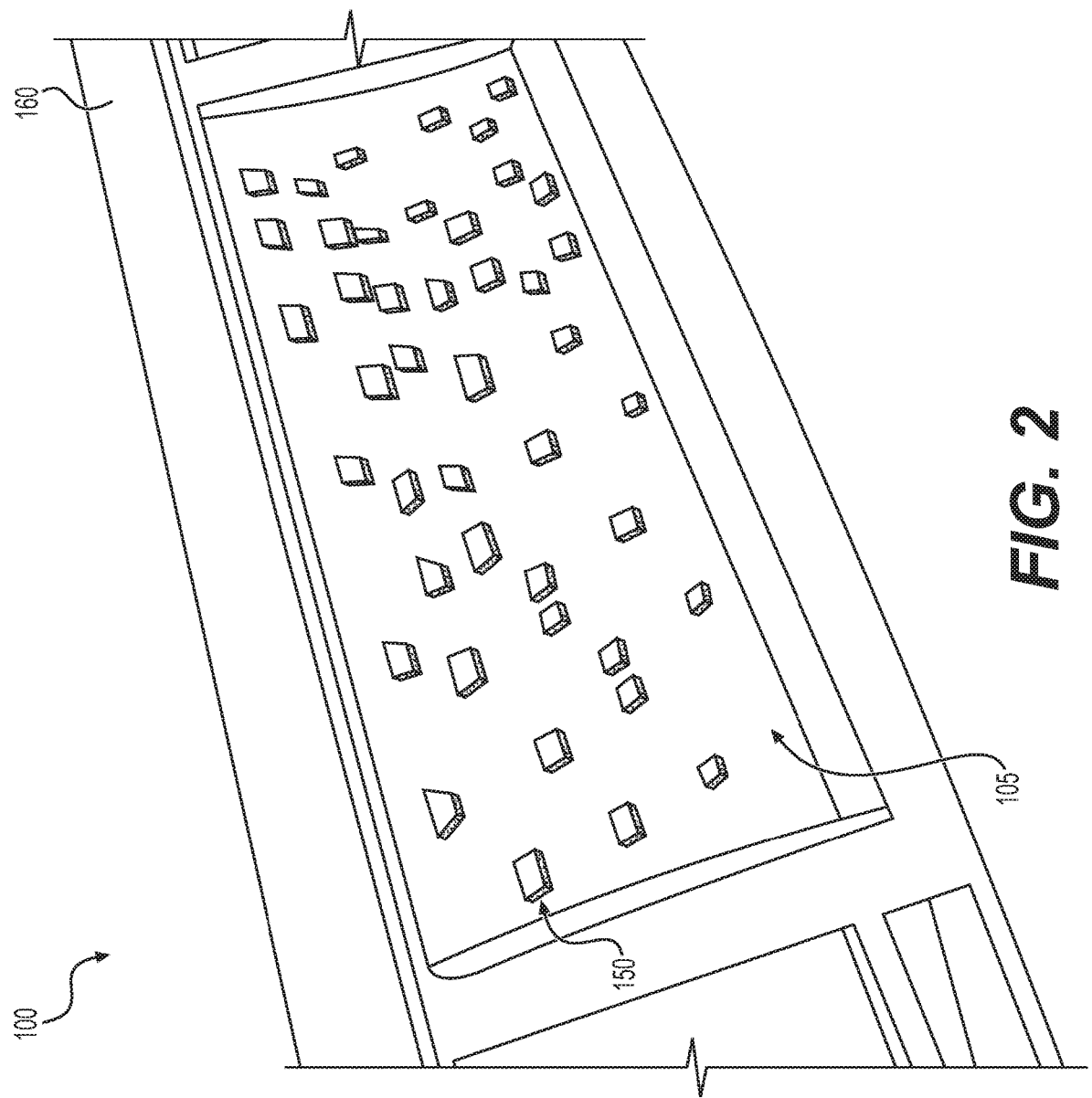
FIG. 2 is a perspective view of a backlit three-dimensional (3D) lamp, in an embodiment.

FIG. 2 is a perspective view of backlit 3D lamp 100, FIG. 1. A lamp housing 160 is adapted to provide structural support and to align outer lens 105 with lenticular sheet 110 and light source 140. An exemplary 3D floating image 150 is depicted in FIG. 2. The 3D floating image 150 hovers between about 0.1-inch to about 3-inches in front of outer lens 105, depending on characteristics of lenticular sheet 110, rendering 130 and light source 140, and the distances therebetween. In certain embodiments, the 3D floating image 150 hovers between about 0.5-inch to about 2.5-inches in front of outer lens 105. In some embodiments, the 3D floating image 150 hovers between about 1-inch to about 2-inches in front of outer lens 105.

Figure 3:
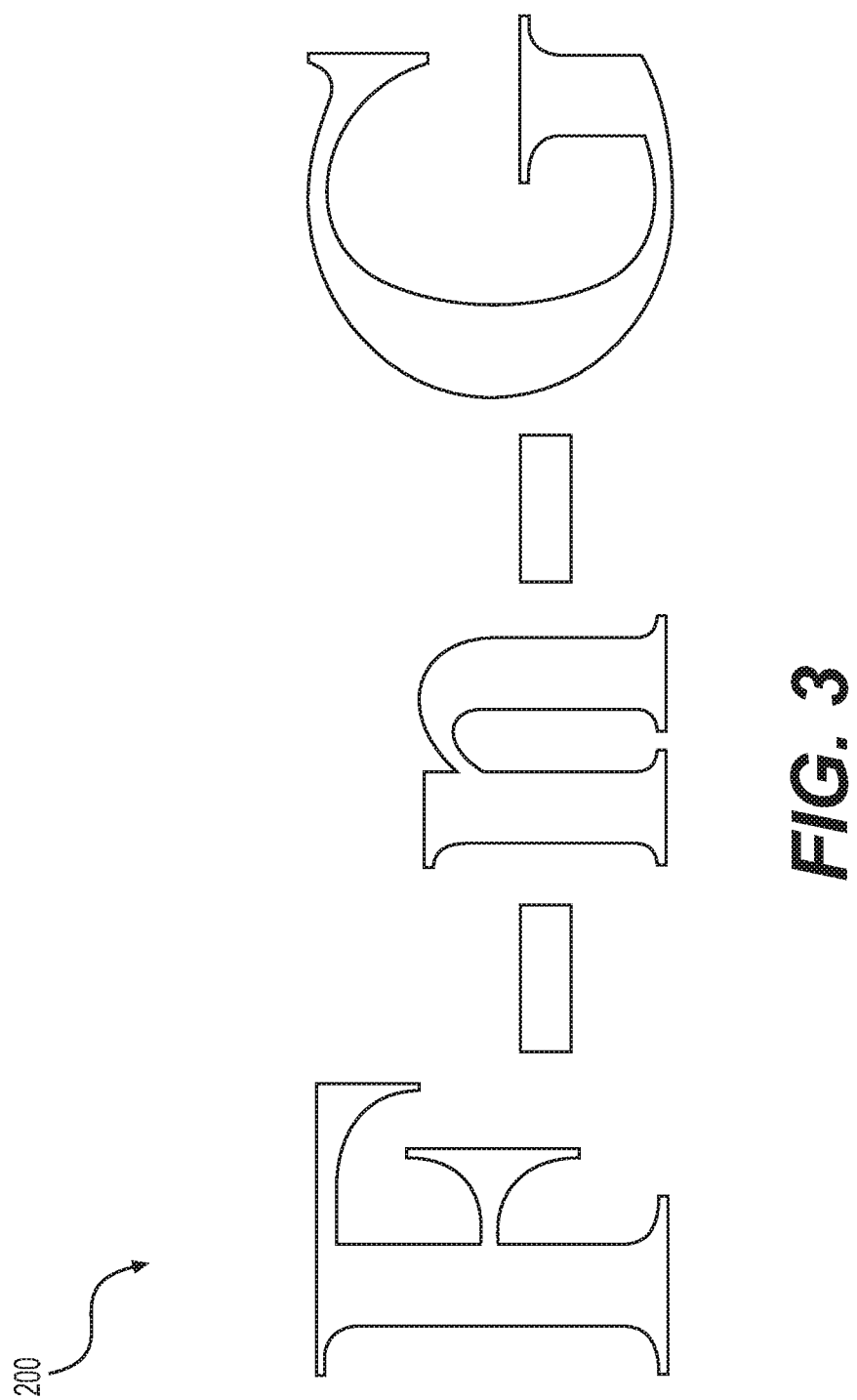
FIG. 3 shows a two-dimensional (2D) marking for displaying, in an embodiment.

FIG. 3 shows an exemplary two-dimensional (2D) marking 200 for displaying. For the 2D marking 200 to be used in backlit 3D lamp 100 of FIG. 1, the 2D marking is converted into a 3D rendering of marking 200, as depicted in FIG. 4.

Figure 4:
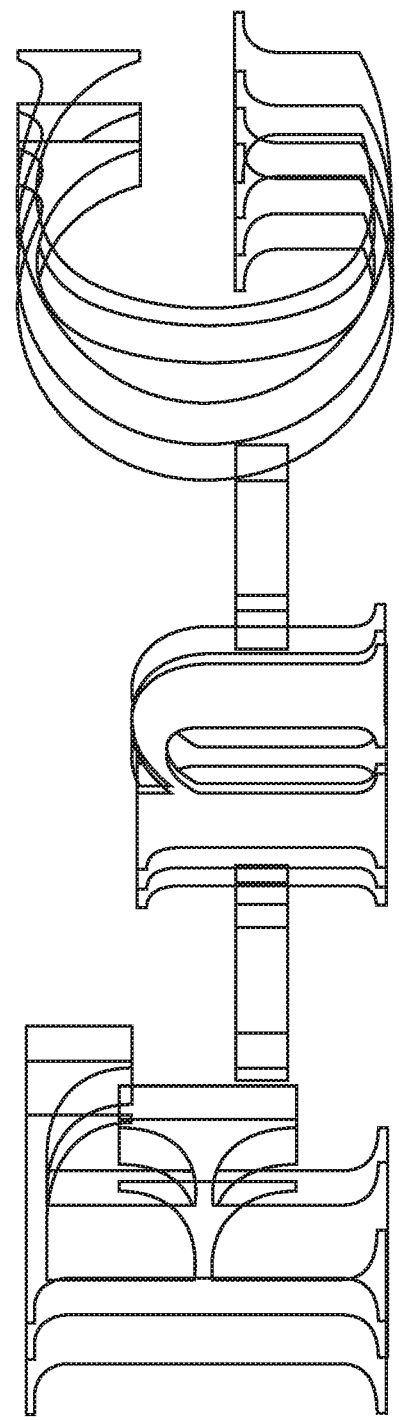
FIG. 4 shows a 3D rendering of the marking of FIG. 3 for a 3D projection, in an embodiment.

FIG. 4 shows an exemplary 3D rendering 300 of the marking of FIG. 3. The 3D rendering 300 is an example of rendering 130, FIG. 1. In certain embodiments, 3D rendering 300 is an interlaced image configured for 3D projection via lenticular sheet 110. Conversion of a 2D marking to a 3D rendering may be performed using specialized software, as known to one of skill in the art of producing 3D images. The 3D rendering 300 is disposed adjacent to lenticular sheet 110 via adhesive 120. The array of convex lenses of lenticular sheet 110 face away from 3D rendering 300 such that a 3D floating image (e.g., 3D floating image 150, FIG. 1) of 3D rendering 300 is projected outside lamp 100 when backlit. The prescription of the convex lenses is adapted such that each eye of a person viewing the 3D rendering sees separate images, and the person's mind creates an illusion that appears as a 3D image hovering outside the lamp 100.

Figure 5:
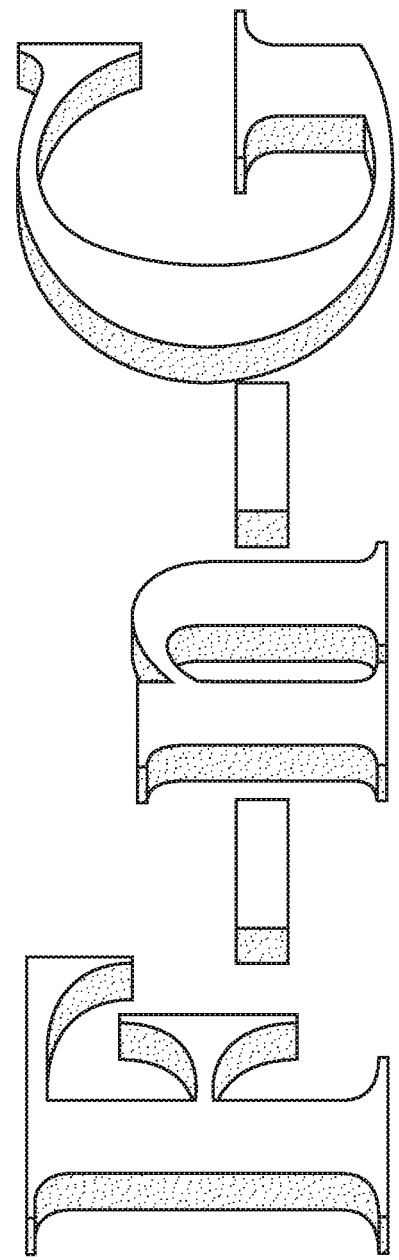
FIG. 5 shows a perspective view of a 3D projection from a backlit 3D lamp, in an embodiment.
Figure 6:
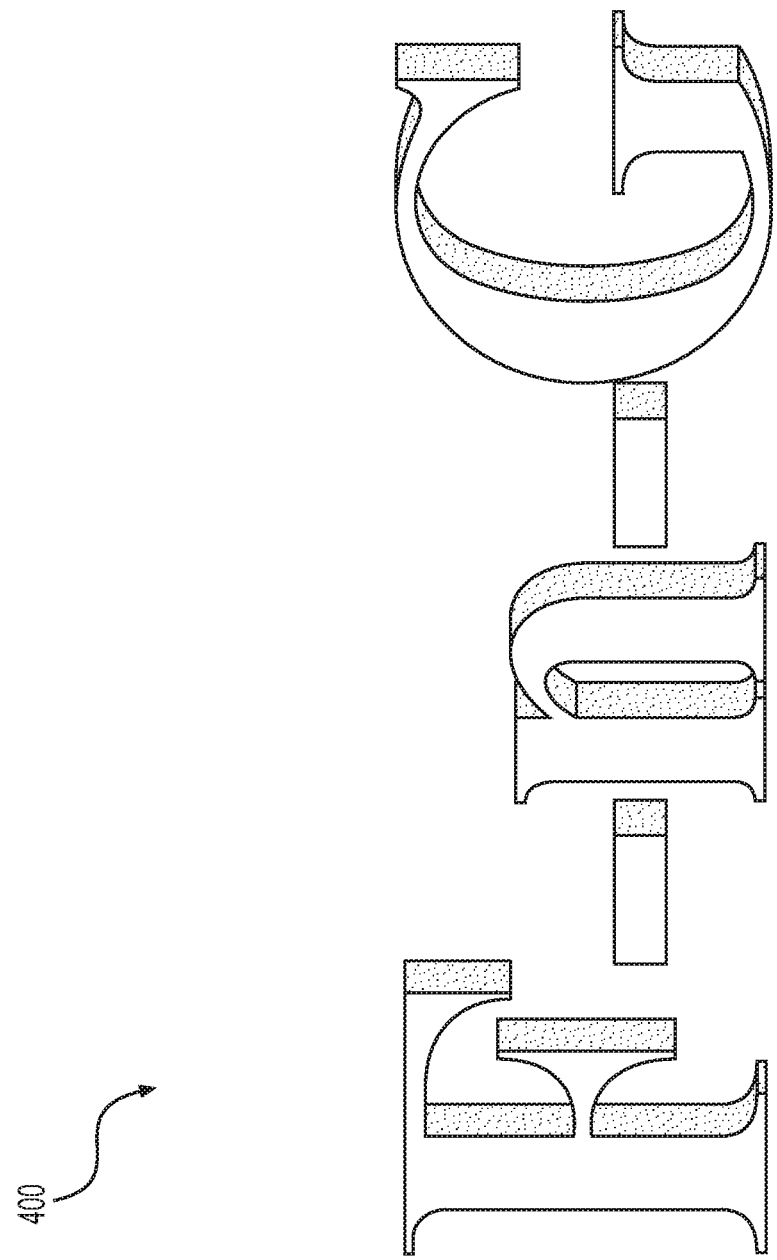
FIG. 6 shows another perspective view of the 3D projection of FIG. 5.

FIG. 5 shows a perspective view of an exemplary 3D projection 400 from a backlit 3D lamp. The 3D projection 400 is an example of an indicia rendering projected outside a vehicle lamp. FIG. 6 shows another perspective view of 3D projection 400. The two perspective views of FIGS. 5 and 6 illustrate how the appearance of the 3D projection 400 changes depending on the angle by which the projected indicia rendering is viewed. For example, FIG. 5 illustrates 3D projection 400 as viewed from about plus thirty degrees to one side, whereas FIG. 6 illustrates 3D projection 400 as viewed from about minus thirty degrees (e.g., thirty degrees from the opposite side).

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A backlit three-dimensional lamp for a vehicle, comprising:

a transparent lenticular sheet having a first side and a second side opposite the first side, the first side being substantially flat and the second side having a plurality of convex lenses;

an indicia rendering disposed on a semi-opaque material, the semi-opaque material being fixed to the first side of the transparent lenticular sheet;

an outer lens positioned adjacent the second side of the transparent lenticular sheet, the outer lens adapted to permit ambient light to enter for illuminating the indicia rendering in an unlit mode;

a light source positioned adjacent the transparent lenticular sheet to provide backlighting of the indicia rendering in a lit mode such that the lenticular sheet projects an image of the indicia rendering that hovers beyond the outer lens according to a focal length of the plurality of convex lenses; and the indicia rendering comprises an interlaced image of a marking, and the transparent lenticular sheet is adapted to project the interlaced image of the marking to produce a three-dimensional projection of the indicia rendering.

2. The backlit three-dimensional lamp of claim 1, further comprising a housing adapted to structurally support the transparent lenticular sheet, the outer lens, and the light source in alignment with one another.

3. The backlit three-dimensional lamp of claim 1, wherein the semi-opaque material is fixed to the first side of the transparent lenticular sheet with an optically clear adhesive film.

4. The backlit three-dimensional lamp of claim 1, wherein the transparent lenticular sheet at least partially covers the indicia rendering creating a projection of the indicia rendering outside the backlit three-dimensional lamp.

5. The backlit three-dimensional lamp of claim 4, wherein the projection of the indicia rendering appears to change based on a changing angle by which the backlit three-dimensional lamp is viewed.

6. A vehicle light assembly, comprising:

a light source adapted to produce a substantially homogeneous light in a lit mode;

an image layer comprising a rendering of indicia, wherein the image layer is located adjacent the light source such that the rendering of indicia appears backlit by the light source in the lit mode;

an array of light-modifying elements adhered to the image layer, opposite the light source, to at least partially cover the rendering of indicia for creating a projection of the rendering of indicia outside the vehicle light assembly;

the rendering of indicia comprises an interlaced image adapted for three-dimensional projection by the array of light-modifying elements such that the projection of the rendering of indicia has a three-dimensional appearance when backlit by the light source; and an outer lens positioned adjacent the array of light-modifying elements, the outer lens being made of transparent material adapted to protect the array of light-modifying elements, the rendering of indicia, and the light source from outside elements while allowing ambient light to pass through, such that in an unlit mode, the indicia rendering is visible from outside the outer lens.

7. The vehicle light assembly of claim 6, wherein the array of light-modifying elements are formed of a plastic optically clear lenticular sheet.

8. The vehicle light assembly of claim 6, wherein the array of light-modifying elements is an array of lenses each having a flat side and a convex side opposite the flat side, wherein the array of lenses are adapted to focus light according to a particular focal length.

9. The vehicle light assembly of claim 8, wherein the array of lenses is aligned along the optical axis and arranged such that the flat side is facing the rendering of indicia, and the convex side is oriented away from the rendering of indicia, such that the array of lenses projects a three-dimensional floating image of the rendering of indicia outside the outer lens of the vehicle light assembly.

10. The vehicle light assembly of claim 9, wherein the three-dimensional floating image hovers in front of the outer lens of the vehicle light assembly.

11. The vehicle light assembly of claim 10, wherein the three-dimensional floating image hovers between about one-inch outside the outer lens surface to about two-inches outside the outer lens surface based on a focal length of the array of lenses and distances between the light source, the rendering of indicia, and the array of lenses.

12. A vehicle light assembly, comprising:
    an optical sheet having a flat first side and an array of convex lenses on a second side opposite the flat first side;
    a rendering layer comprising an indicia rendering disposed on a semi-opaque material;
    an optically clear adhesive that adheres the rendering layer to the flat first side of the optical sheet;
    a light source disposed adjacent the rendering layer for backlighting the rendering layer in a lit mode;
    an outer lens positioned adjacent the second side of the optical sheet;
    a lamp housing adapted to structurally support and align the outer lens, the optical sheet, and the light source such that in the lit mode, the light source provides backlighting of the rendering layer to project a forward image of the indicia rendering that hovers beyond the outer lens; and
    in an unlit mode, ambient light is received through the outer lens for illuminating the rendering layer such that the indicia rendering is visible from outside the outer lens.

13. The vehicle light assembly of claim 12, wherein the indicia rendering comprises an interlaced image, and the optical sheet has a focal length adapted to project the interlaced image such that, in the lit mode, a three-dimensional indicia rendering is projected in front of the outer lens.

14. The vehicle light assembly of claim 6, wherein the image layer is printed on a semi-opaque sheet.

* * * * *